United States Patent [19]

Sanchez

[11] Patent Number: 4,856,133
[45] Date of Patent: Aug. 15, 1989

[54] LOW PROFILE GEAR DRIVEN ROTARY SCRUB BRUSH

[75] Inventor: George Sanchez, Chatsworth, Calif.

[73] Assignee: Clyde Industries Limited, New South Wales, Australia

[21] Appl. No.: 899,336

[22] Filed: Aug. 21, 1986

[51] Int. Cl.⁴ .............................................. A46B 13/06
[52] U.S. Cl. ...................................................... 15/29
[58] Field of Search ............... 15/23, 24, 28, 29, 97 R; 415/95

[56] References Cited

U.S. PATENT DOCUMENTS

| | | |
|---|---|---|
| 137,865 | 4/1873 | Richardson . |
| 661,277 | 11/1900 | Rix .......................................... 15/29 |
| 2,678,457 | 5/1954 | Demo et al. . |
| 3,078,488 | 2/1963 | Helm . |
| 3,197,176 | 7/1965 | Brunel et al. . |
| 3,401,416 | 9/1968 | Ziegler . |
| 3,562,843 | 2/1971 | Belicka et al. . |
| 4,228,558 | 10/1980 | Zhadanov . |
| 4,327,454 | 5/1982 | Spence . |
| 4,432,355 | 2/1984 | Delluc . |
| 4,513,466 | 4/1985 | Keddie et al. . |
| 4,679,270 | 7/1987 | Gaiti ......................................... 15/29 |
| 4,686,729 | 8/1987 | Roman et al. .......................... 15/29 |

FOREIGN PATENT DOCUMENTS

| | | | |
|---|---|---|---|
| 197038 | 4/1958 | Austria ................................. 15/29 |
| 1155260 | 10/1983 | Canada ................................. 15/29 |
| 1021147 | 12/1957 | Fed. Rep. of Germany .......... 15/29 |
| 3113645 | 10/1982 | Fed. Rep. of Germany .......... 15/29 |
| 1253079 | 12/1960 | France . |
| 2295800 | 7/1976 | France .................................. 15/29 |
| 2555951 | 6/1985 | France .................................. 15/29 |
| 345861 | 4/1931 | United Kingdom ................. 15/29 |

Primary Examiner—Edward L. Roberts
Attorney, Agent, or Firm—Christie, Parker & Hale

[57] ABSTRACT

A fluid driven assembly for a rotary brush comprising a housing. The housing has a top side and bottom side which converge moving toward an opposite end relative to an inlet end for fluid, thus providing a very low profile assembly, resulting in limited internal cavity space for mounting the fluid driven mechanism. Within the housing cavity is a rotary brush mounting adaptor, with affixed gear teeth, for removably mounting such a rotary brush facing out of an opening in the bottom of the housing and with the adaptor and affixed gear teeth rotating about an axis extending out of the opening. Also in the housing is a waterwheel, with affixed gear teeth, rotating about a second axis displaced toward the inlet end from the first axis. The adapter and waterwheel gear teeth are in driving engagement and water vanes on the waterwheel are axially displaced toward the top side from the adaptor and waterwheel gear teeth.

22 Claims, 12 Drawing Sheets

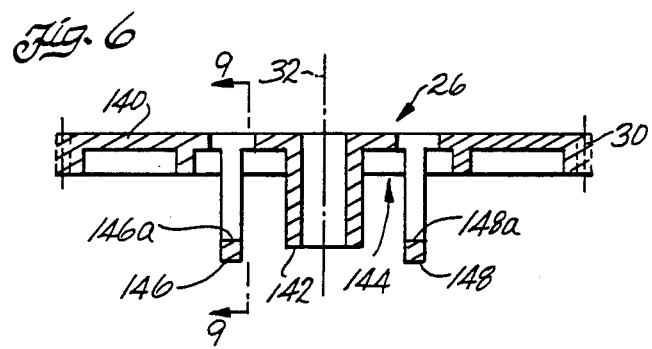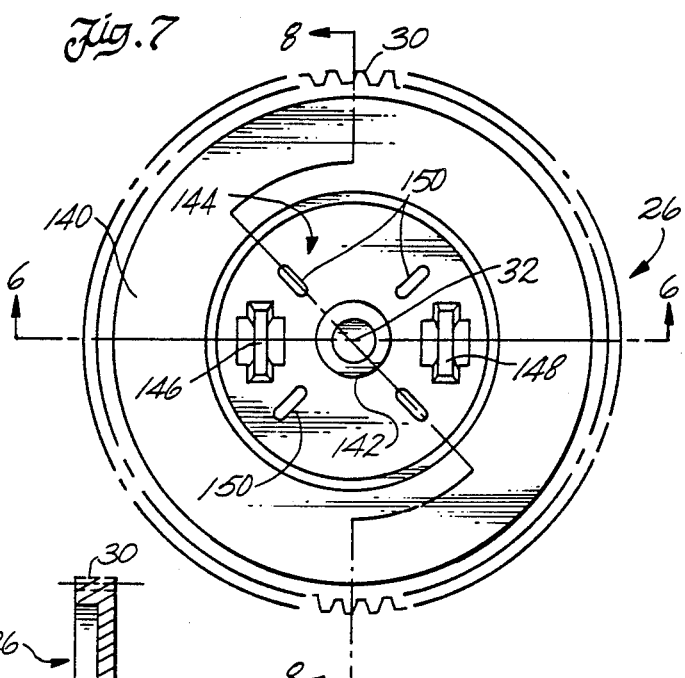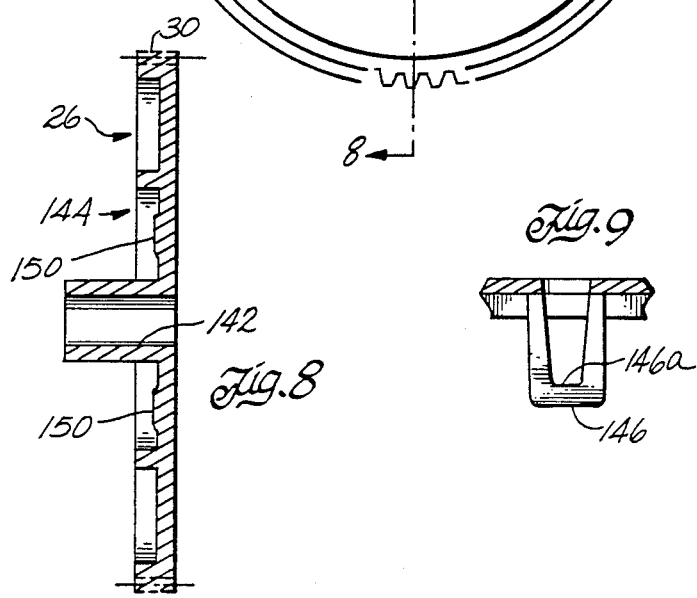

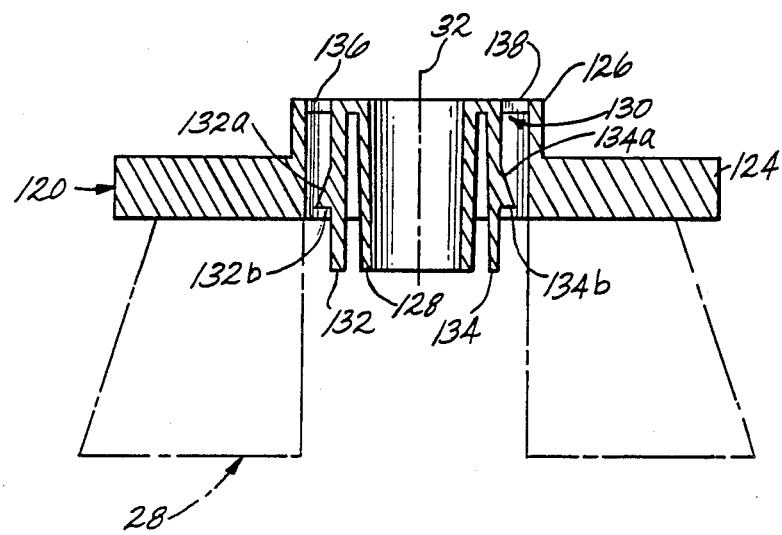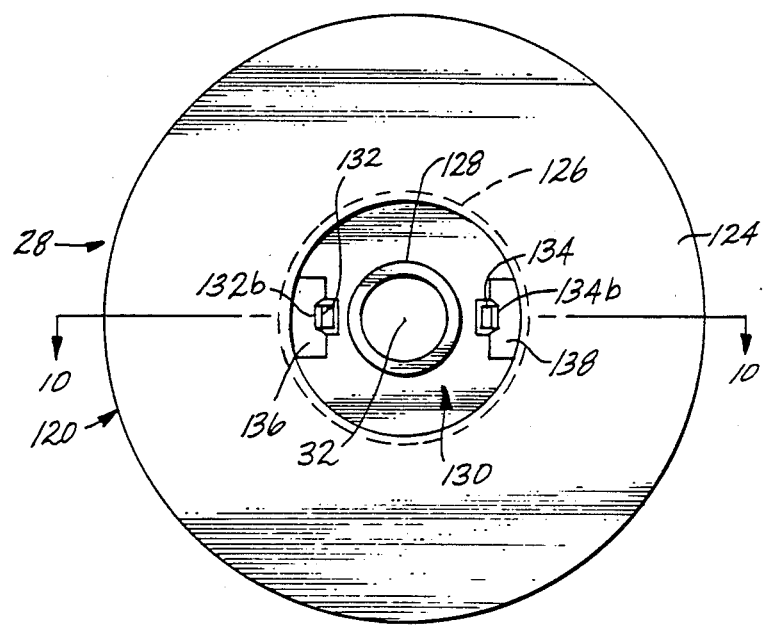

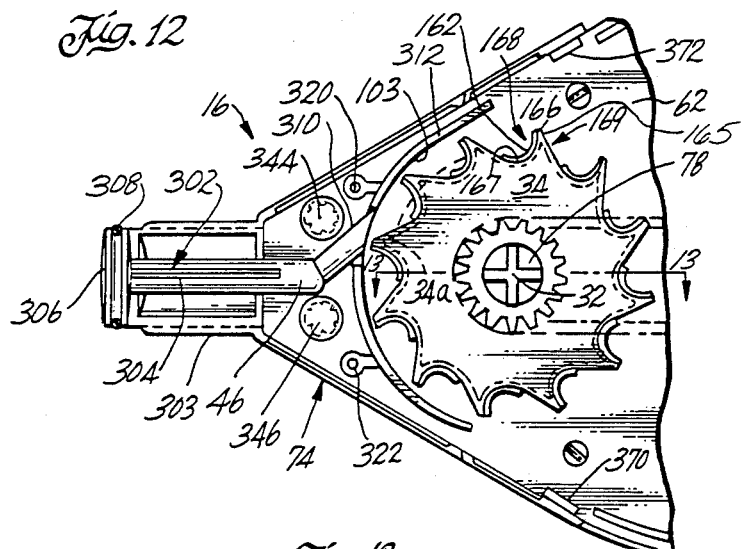
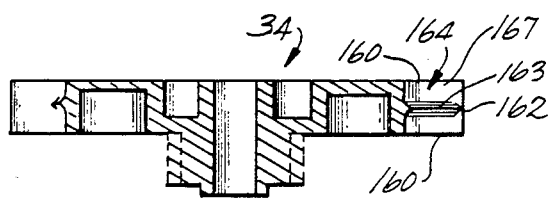
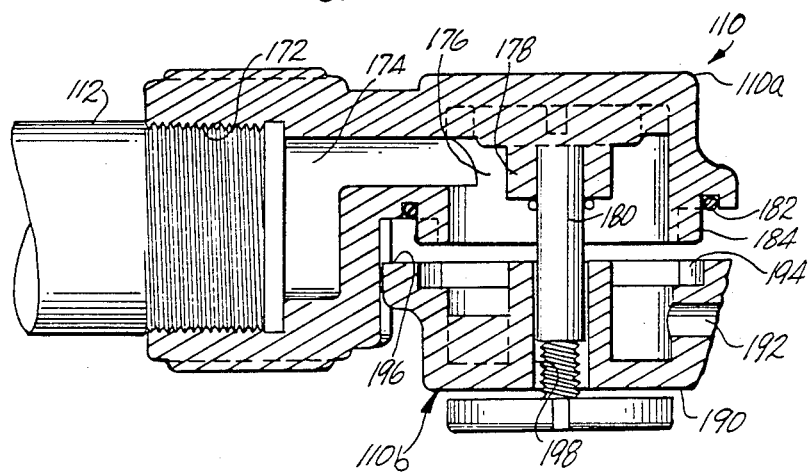

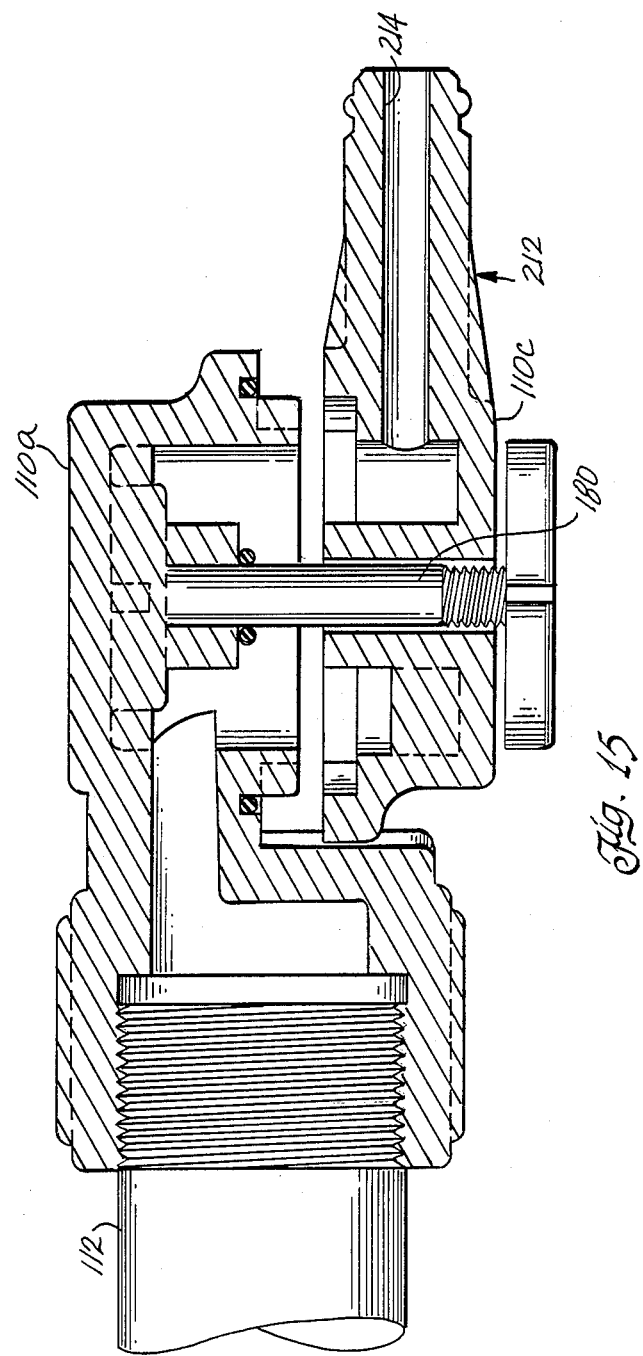

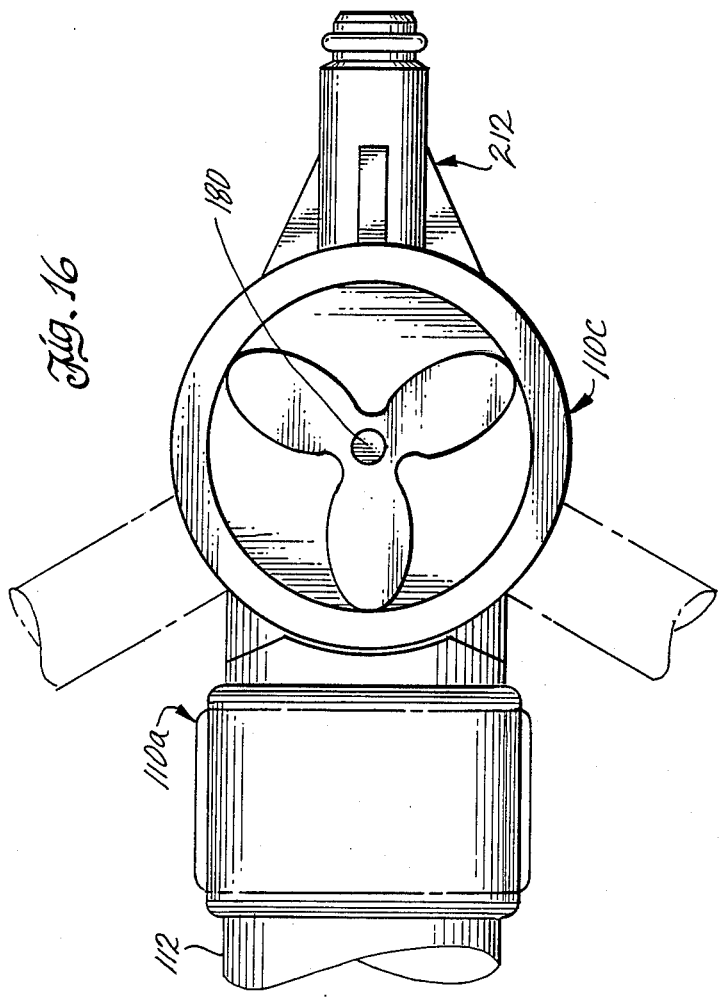

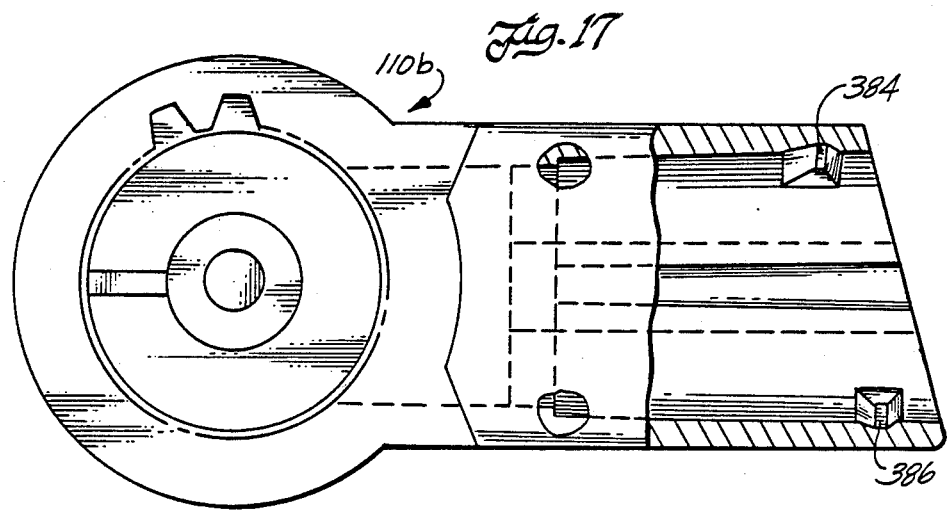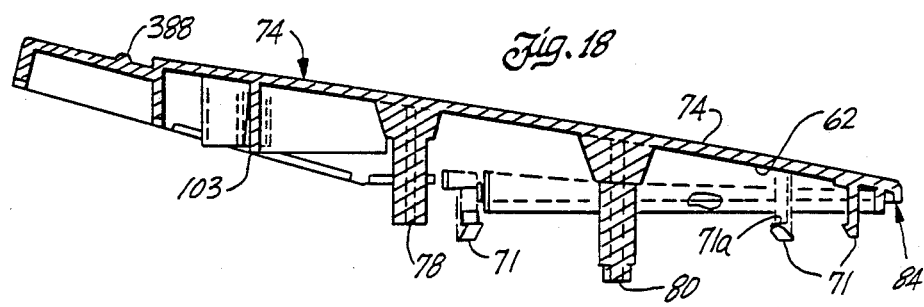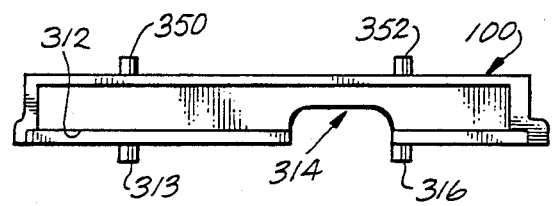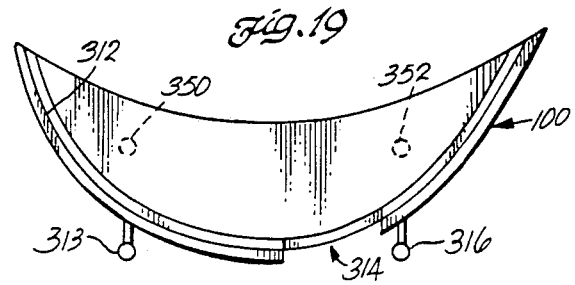

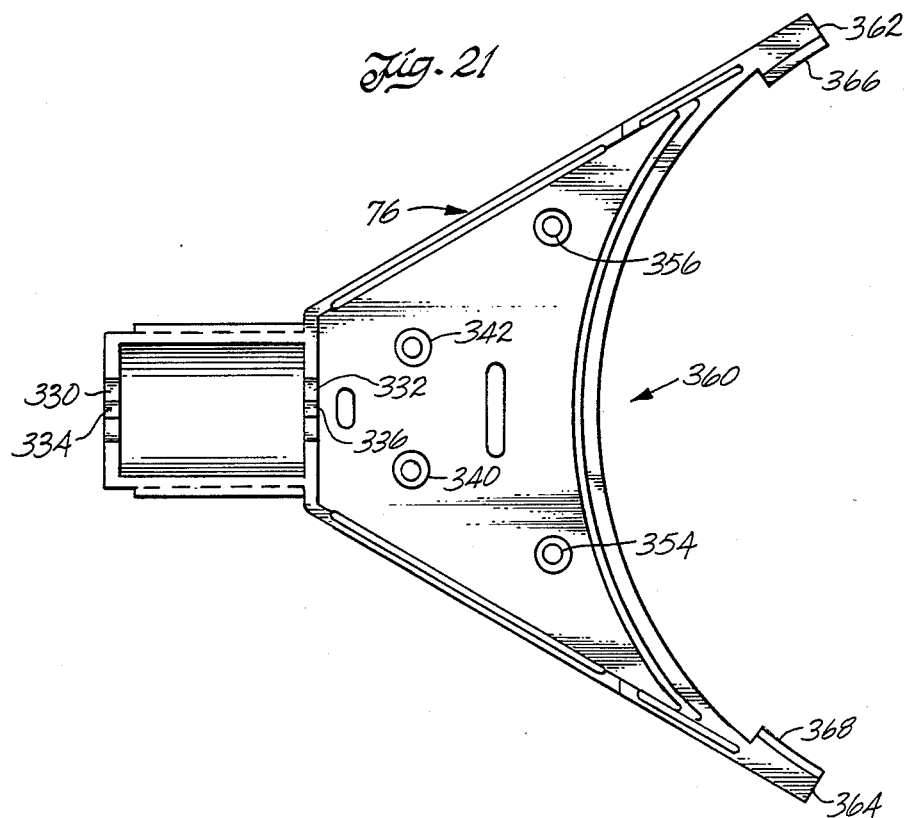

LOW PROFILE GEAR DRIVEN ROTARY SCRUB BRUSH

FIELD OF THE INVENTION

This invention relates to water driven rotary brushes having a fluid driven water impeller and waterwheel.

BACKGROUND OF THE INVENTION

Many fluid driven rotary scrub brushes have been devised but only a few of these are being manufactured and sold at the present time.

The most technically advanced rotary scrub brush, now being marketed, is one similar to that disclosed in Canadian Pat. No. 1,155,260. The device, by and large, is made of injection molded plastic parts, many of which are glued together. Because of the requirement for gluing, there is a limitation on the type of plastic material that can be used preventing, for example, the use of higher strength plastics.

Briefly, this device has a housing with a top side elongated between a fluid inlet end and an opposite end of the housing. The housing has a circular bottom side facing substantially opposite from the top side with a cavity in the housing and a circular opening through the bottom side to the cavity. The housing has a very low profile and limited internal space as it converges, in cross section, between the top side and bottom side, moving towards the opposite end relative to the inlet end. In addition, the housing converges in a transverse direction from a longitudinal center line.

The housing includes a neck portion, extending from a circular portion, through which fluid passes. In addition, a soap dispenser is located in the neck portion from which soap or detergent is dispensed into the fluid. The housing around the opening to the cavity is circular and within the circular opening is placed a waterwheel with curved open sided cups or vanes which extend generally radially out from the waterwheel. The waterwheel is rotatably mounted on a metal shaft which is molded on the inside wall of the housing. The rotary brush is formed as an integral part of the waterwheel. Brush bristles on the rotary brush extend out of the opening from the rotor. Annular shaped fixed brush bristles extend around the opening and the rotary brush. A nozzle is located in the neck portion and dispenses fluid (water and detergent) against the vanes of the waterwheel, thereby rotating the waterwheel and hence the rotary brush.

A fluid passing swivel has one swivel part connected to the throat portion of the housing and another part connected to a fluid conduit.

The housing is constructed in three parts. A top housing portion is elongated having a generally tear drop shape from the top and has a semi-circular portion and an inlet portion. A combined lower housing portion and fixed brush is elongated having a semi-circular portion and an inlet portion. The semi-circular portion contains the opening to the cavity and brush bristles are mounted in the lower housing. The lower housing is glued to the lower side of the upper housing to form the completed housing. During the gluing process an elongated nozzle is bonded from three parts and bonded into the upper and lower housing. A soap reservoir is made up of bonded parts in the lower housing. A knob with a needle point controls the amount of soap being dispensed from the reservoir to the nozzle as it dispenses fluid to the vanes on the waterwheel.

The housing is connected to a fluid conduit by means of a fluid passing swivel that has one part connected to a coupling which is bonded around a cylindrical portion of the inlet portion for the housing. The swivel has a second tubular shaped coupling which is bonded around the fluid conducting conduit. In addition to bonding or gluing the various parts of and in the housing, the tubular coupling is glued in order to affix it around the upper and lower housing portion.

All of the parts of the housing, the nozzle, the reservoir and the swivel are entirely plastic molded parts except for the metal shafts molded in its upper housing for mounting the combined waterwheel and rotary brush, the metal shaft molded into one of the parts of the swivel, and a metal clip to hold the combined waterwheel and brush base on the shaft.

Several problems have arisen with this construction, for example, bonding or gluing substantially increases costs and restricts the type of plastic materials that can be used to a lower strength plastic. High fluid pressures are encountered in the soap reservoir. Therefore, good glue joints are quite critical.

It has also been found that during the assembly process the parts of the housing are somewhat difficult to store and stack. For example, the integrally formed fixed brush base and lower housing is quite difficult to stack, creating difficulties during assembly.

It has also been found that problems arise where water supply pressures is low and/or inconsistent as low and/or inconsistent output power or torque to the rotary brush results.

It is also difficult for the user to replace the rotary brush and the waterwheel must be replaced along with the brush.

Also, a special deflector is required to reduce the amount of water being thrown out, by the combined rotating waterwheel and brush, for example, transversely towards the user. Thus, a more even distribution flow of water down around the rotary brush for scrubbing purposes is desired.

Further, there has been a long need for allowing the user to, not only use the rotary scrub brush head, which is rotatable with the use of the swivel, but to provide a spray of water for cleaning in close spaces and at acute angles to the fluid conduit.

In addition to the need for increasing magnitude and consistency of the output power, it is desirable to provide a rotary brush which can be used in immersed conditions, for example, for cleaning the sides of pools and the like. Increased power output can be obtained by placing gearing between the waterwheel and the rotary brush. However, this is difficult to achieve in the limited space available in the housing. Also, exposed gearing or other moving parts are undesirable because foreign particles can get wedged between the gears and the exposed gears can cause damage to fragile paint surfaces and alike and to the user.

The overall shape and appearance of the housing is of a distinctive design which is unique to the products of the assignee in this case and must be retained even though the aforementioned problems must be overcome.

In addition to the Canadian patent, other patents are known which have a generally elongated housing between an inlet and an opposite end. By way of example, note the following: Williams U.S. Pat. No. 2,759,208, Nicholson U.S. Pat. No. 4,089,079, Zhadanov U.S. Pat. No. 4,228,558, Spence U.S. Pat. No. 4,327,454, Gonzalvo U.S. Pat. No. 4,370,771, Keddie U.S. Pat. No. 4,513,466; and the German patent Offenlegungsschrift No. 13645.

Various techniques have been used for increasing the power output from fluid driven waterwheel. By way of example, one group of devices are known in which the vanes on the waterwheel are ribbed to assist in the placement of water, however, the sides of the vanes on opposite sides of the ribs are closed, see for example Richwood U.S. Pat. No. 890,709 and the chapter entitled "Hydraulic Turbines by R. M. Donaldson" appearing in *Marks Engineering Handbook by Marks & Bauemister,* Published by McGraw & Hill Book Co., 1958. In other designs the cups are flat or curved but do not have ribs. See for example the waterwheel in the above identified Canadian patent; Hubert U.S. Pat. No. 2,019,705, Batlas et al U.S. Pat. No. 2,717,403, Man-King U.S. Pat. No. 3,869,746, Bryerton U.S. Pat. No. 4,060,871, Sekula U.S. Pat. No. 4,207,640, Malcolm U.S. Pat. No. 4,279,051 and Daniels U.S. Pat. No. 4,290,160; the Austrian Pat. No. 195863 and the Japanese Pat. No. 52-45163 (4/9/77). The Smith U.S. Pat. No. 4,084,281 discloses closed vanes or holes. Puddling of water on the water vanes and, therefore, reduced output power are problems with these waterwheel patents.

One group of fluid driven rotary scrub brushes or the like are known which have a housing with a cavity therein that contains a fluid driven waterwheel which in turn drives a rotary brush mounted exterior to the housing. Gearing is provided to increase the power between the waterwheel and the rotary brush, some or all of which is external to the housing. Note, for example, Rix U.S. Pat. No. 661,277 and to Spence U.S. Pat. No. 4,327,454. The problem of external moving parts mentioned above is applicable to these devices.

The Gonzalvo U.S. Pat. No. 4,370,771 has separate cavities for the waterwheel and the rotary brush and its size is not a restriction.

Other rotary brushes are known that have a fluid driven waterwheel within a cavity, with a rotary brush, driven by the waterwheel, external to the cavity. The axis of rotation of the waterwheel is on the opposite side of the axis of rotation of the rotary brush from the fluid inlet to the cavity or housing with the waterwheel. Nozzles or passages are required to conduct the fluid from the fluid inlet over to the, waterwheel, thus making it difficult to reduce the size of the housing. See for example the Rix U.S. Pat. No. 661,277 and to Boyle U.S. Pat. No. 2,540,240. Along these same general lines note the Spence U.S. Pat. No. 4,327,454.

In addition to the Canadian patent mentioned above, there are a large group of rotary brushes and alike that have a waterwheel in a cavity of the housing in direct drive with the rotary brush without any gearing, some where the rotary brush is within and some outside of the cavity. Note, for example, Wensinger U.S. Pat. No. 846,636, Patrick U.S. Pat. No. 919,756, Masser U.S. Pat. No. 1,375,102, Emerson U.S. Pat. No. 1,813,569, Karas U.S. Pat. No. 2,284,213, Chiaie U.S. Pat. No. 2,514,934, Williams U.S. Pat. No. 2,759,208, Swearngin U.S. Pat. No. 2,918,686, Williams U.S. Pat. No. 3,074,088, Williams U.S. Pat. No. 3,153,799, Frandsen U.S. Pat. No. 3,431,573, Gaudio U.S. Pat. No. 3,813,721, Kadlub U.S. Pat. No. 4,155,137, Zhadanov U.S. Pat. No. 4,228,558, Malcolm U.S. Pat. No. 4,279,051, Zhadanov U.S. Pat. No. 4,374,444, Floros U.S. Pat. No. 4,417,826, Smyth U.S. Pat. No. 4,471,503, Watanabe U.S. Pat. No. 4,531,250 and Smyth U.S. Pat. No. 4,532,666.

A group of devices are also known that have a combined waterwheel and waterwheel gear and a combined rotary brush and rotary brush gear, all coaxially mounted with side gearing to connect the waterwheel wheel gear to the rotary brush gear. The rotary brush in some is contained within and some outside of the cavity. Note, for example, Demo U.S. Pat. No. 2,678,457, Alpert U.S. Pat. No. 2,797,132, Keddie U.S. Pat. No. 4,513,466 and Mostul U.S. Pat. No. 4,461,052, the W. German patent to Offenlegungsschrift (December 31) 13645A1, and the Swiss patent to Schrift No. 436,216. Replacement of the brush requires replacement of gearing in these devices.

Waterwheel driven rotary brushes are also known which have a plate or other member that is rotated by the waterwheel on which means is provided for removably mounting the rotary brush to the rotary plate or member. Attachment is by screws, clips, studs and washers, key slotted rings, cotter pins and thumb screws. Note for example Rix U.S. Pat. No. 661,277, Light et al. U.S. Pat. No. 1,212,967, Young U.S. Pat. No. 1,479,272, Karas U.S. Pat. No. 2,284,213, Boyle U.S. Pat. No. 2,540,240, Sears U.S. Pat. No. 2,659,915, Batlas et al. U.S. Pat. No. 2,717,403, Williams U.S. Pat. No. 2,759,208, Williams U.S. Pat. No. 3,074,088, Williams U.S. Pat. No. 3,153,799, Frandsen U.S. Pat. No. 3,431,573, Gaudio U.S. Pat. No. 3,813,721, Lanusse U.S. Pat. No. 3,943,591, Kadlub U.S. Pat. No. 4,155,137, Sekula U.S. Pat. No. 4,207,640, Malcolm U.S. Pat. No. 4,279,051, Spence U.S. Pat. No. 4,327,454; the Austrian Pat. No. 195863; Canadian Pat. No. 1,155,260 and Japanese Pat. No. 52-45163 (4/9/77). One such device has a bayonet type or detent locking mechanism. Note the Chiaie U.S. Pat. No. 2,514,934 that discloses a rotary scrub brush having an interchangeable rotary brush which utilizes a spring biased ball to removably attach the rotary brush to a drive hub. Problems presented in the Chiaie device include the large number of separate parts, compared with an embodiment of the present invention, the likelihood that parts may become hard to deactuate and even freeze making removal of the rotary brush difficult and the difficulty of grabbing hold of any part of the rotary brush, except the bristles, for removal. Also, the device does not lend itself to all or nearly all plastic molding of the parts increasing cost of manufacture.

The Demo U.S. Pat. No. 2,678,457, discloses a device where the rotary brush is connected to the member rotated by the waterwheel using large headed bolts which insert into large diameter apertures and are rotated to smaller diameter apertures where an interference parallel with the axis of rotation is formed.

Disadvantages applicable to one or more of the devices discussed in the preceeding two paragraphs include inability or difficulty to manufacture injection molded plastic parts, relative high cost of manufacture, difficulty of removing the rotary brush and the need to prevent rotation by holding the rotary brush, gearing or waterwheel in order to unlock or remove the rotary brush.

One device has a ring shaped cover that holds the waterwheel in place on a rotatable shaft. See, for example, Kiddie U.S. Pat. No. 4,513,466. However, removal of the cover allows other internal parts to come loose and fall out.

Another type of device has a rotary brush that snaps in place on a shaft and is removable by pulling the brush parallel with the shaft. However, the brush is directly rotated by gearing connected directed to the rotary brush. See Higdon U.S. Pat. No. 2,933,747.

Hubert U.S. Pat. No. 2,019,705 discloses a rotary brush base where a keyed hub slips around a keyed boss which in turn is driven by a waterwheel. A spring loaded ball detent retains the hub and waterwheel in place on the boss. With this device the rotary brush base snaps in place and is removed by pushing the brush parallel with the axis of rotation and pulling it parallel with the axis of rotation snapping the device in place or out of place. However, this device makes it hard to remove the brush due to the constant friction and drag of the ball detent and it is difficult at best to form from injection molded parts.

Other miscellaneous fluid driven tools are disclosed in the Eichelberger U.S. Pat. No. 1,212,967, Young U.S. Pat. No. 1,479,272, Sears U.S. Pat. No. 2,659,915, Grikscheit U.S. Pat. No. 2,708,599, Hidgon U.S. Pat. No. 2,933,747, Vivion U.S. Pat. No. 3,760,447, Colemann U.S. Pat. No. 3,910,265, Lanusse U.S. Pat. No. 3,943,591, Nicholson U.S. Pat. No. 4,089,079 and Schulz U.S. Pat. No. 4,103,381.

The Durant U.S. Pat. No. 630,600, Broderick U.S. Pat. No. 639,348 and Muend U.S. Pat. No. 1,765,693 disclose fluid passing swivel joint as does the above referenced Canadian patent.

One device is disclosed in the June 12, 1985 issue of the Chicago Tribune and contains a unitary plastic housing having an inlet at one side. A tubular fluid supply conduit is fastened around the inlet portion by detent locking means. A fixed base brush has mounted therein to a water wheel and a directly connected rotary brush. The fixed circular brush ring is mounted around the opening to the housing by a detent interlocking arrangement, which is operated by rotating the brush ring. When mounted the waterwheel is inside of the cavity of the housing and the rotary brush is just outside of and faces away from the cavity of the housing. The waterwheel has cupped shaped vanes with a ridge along the center extending radially outwards and closed sides on opposite sides of the ridge. A nozzle extends out of the opening from the fluid supply tube and directs fluid into the vanes rotating the waterwheel and the rotary brush.

SUMMARY OF THE INVENTION

Briefly, an embodiment of the present invention is a fluid driven assembly for a rotary brush comprising a housing. The housing comprises a top side, elongated between an end, comprising a fluid receiving inlet end of the housing, and an opposite end of the housing. The housing also has a bottom side facing substantially opposite from the top side. A cavity is provided in the housing and an opening is provided through the bottom side to the cavity. The housing converges in cross-section between the top side and bottom side moving towards the opposite end relative to the inlet end, thus providing a very low profile housing but with limited internal space for mounting the fluid driven mechanism. A fixed brush extends substantially around the opening.

Substantially, within the cavity, there is provided a brush mounting adaptor for removably mounting the brush facing out of the opening and adaptor gear teeth affixed to the adaptor. Both the adaptor and gear teeth are mounted for rotation about a common first axis extending out of the opening. Also, substantially within the cavity is a waterwheel and waterwheel gear teeth affixed to the waterwheel. Both the waterwheel and waterwheel gear teeth are mounted for rotation about a second common axis, displaced towards the inlet end from the first axis. The waterwheel gear teeth are in driving engagement with the adaptor gear teeth and the waterwheel comprises waterwheel vanes axially displaced towards the top side from the waterwheel gear teeth and the adaptor gear teeth. Also, within the cavity is a nozzle for dispensing against the water vanes, at a position displaced towards the inlet end from the second axis, fluid received from the inlet end.

Such an arrangement allows the problems associated with prior art devices to be substantially reduced or eliminated and allows a low cost substantially all plastic molded brush assembly to be formed. Also, with this construction a geared waterwheel driven with a brush mounting adaptor is formed within the limited confines of the low profile housing with limited interior space. Preferably, the water receives the fluid within a side cavity minimizing or eliminating the fluid directed out on the user. The shape of the housing and arrangement of parts allows the fluid to be evenly directed and dispersed out of the opening of the rotary brush mounted thereon.

BRIEF DESCRIPTION OF THE DRAWINGS

FIG. 6 is a cross-sectional view of the brush mounting adaptor taken along the lines 6—6 of FIG. 7;

FIG. 7 is a bottom elevation view of the brush mounting adaptor taken from the bottom in FIG. 6;

FIG. 8 is a cross-sectional view of the brush mounting adaptor taken along the lines 8—8 of FIG. 7;

FIG. 9 is a partial sectional view of the mechanical locking loop taken along the lines 9—9 of FIG. 6;

FIG. 10 is a cross-sectional view of the rotary brush taken along the lines 10—10 of FIG. 11;

FIG. 11 is a bottom elevation view of the rotary brush base with the bristles removed for clarity;

FIG. 12 is a view similar to FIG. 5 with the semi-circular portion broken away and having removed, therefrom, the fluid passing swivel, the lower housing portion, the shroud and the brush mounting adaptor and the adaptor gear teeth;

FIG. 13 is a section view of the waterwheel and waterwheel gear teeth taken along the lines 13—13 of FIG. 12;

FIG. 14 is an enlarged exploded cross-sectional view of the fluid passing swivel similar to that depicted in FIG. 2 breaking away the fluid passing swivel portion connected to the housing;

FIG. 15 is a cross-sectional view similar to FIG. 14 of the fluid passing swivel with the fluid passing swivel portion connected to the head replaced with one which is integral with a spray nozzle;

FIG. 16 is a side elevation view taken from the lower side of FIG. 15 showing the fluid passing swivel connected to the nozzle;

FIG. 17 is a side elevation view of the fluid passing swivel portion for connection to the housing with a portion of the tubular portion broken away to reveal the internal shoulders forming a portion of the interlocking mechanical lock;

FIG. 18 is a cross-sectional view of the upper housing portion taken along the line 3—3 of FIG. 2;

FIG. 19 is a top elevation view of the side of the shroud which faces the upper housing portion when assembled;

FIG. 20 is an end view of the shroud shown in FIG. 19; and

FIG. 21 is a top elevation view of the lower housing portion, which faces the upper housing when assembled and retains the shroud in the housing.

DETAILED DESCRIPTION

Figure 1:
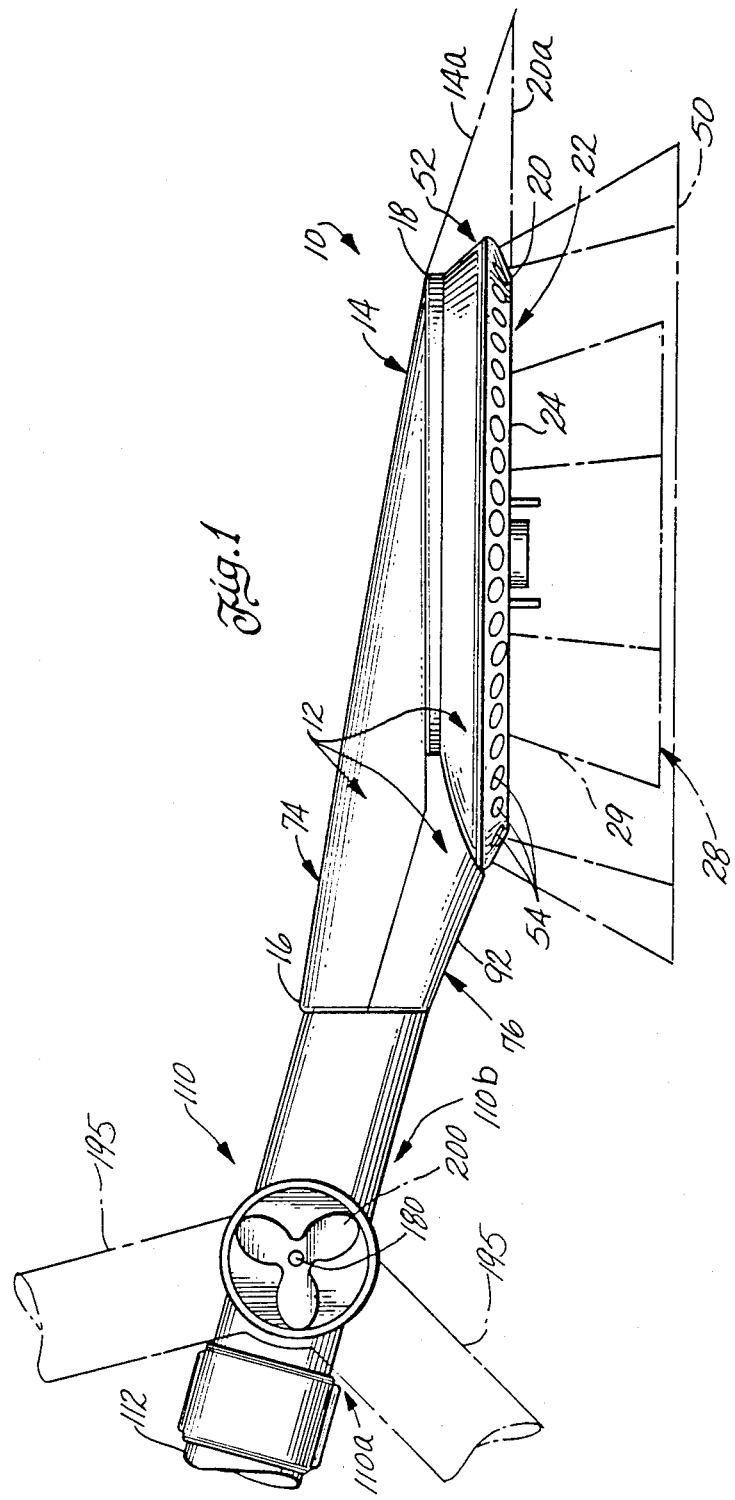
FIG. 1 is a side elevation view of a rotary scrub brush coupled through a fluid passing swivel to a conduit and embodying the present invention.
Figure 2:
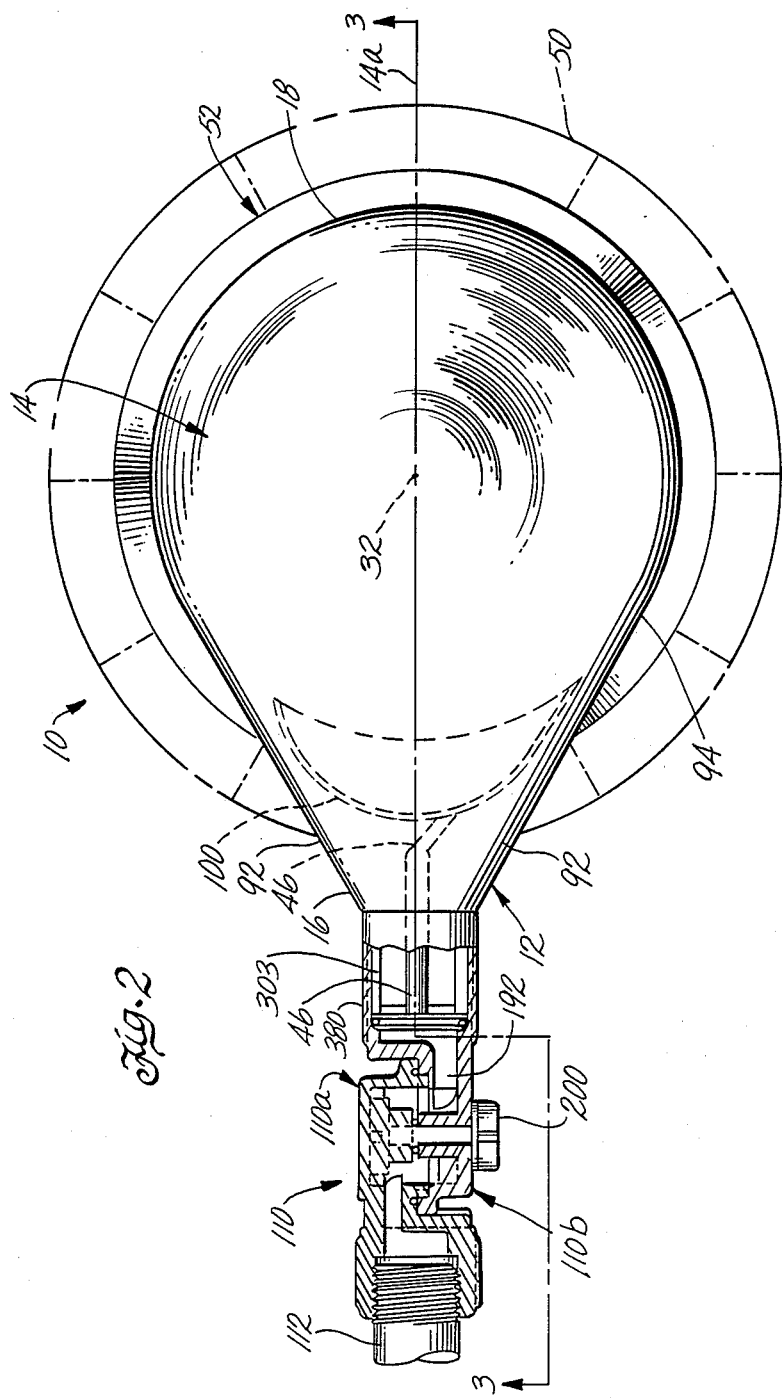
FIG. 2 is a top elevation view of the rotary scrub brush of FIG. 1 showing the cylindrical inlet end and the swivel in cross section. The shroud and a portion of the nozzle are indicated by broken line.

Referring to FIGS. 1-5, there is disclosed a fluid driven rotary scrub brush, including a fluid driven driver 10 for a rotary brush 28. The driver has a fluid receiving inlet, a rotatably mounted waterwheel driven or rotated by the received fluid and a rotary brush mounting adaptor rotated by the waterwheel. The fluid driven driver includes a housing 12 with a top side 14, elongated along line or plane 14a between an end 16, comprising a fluid receiving inlet end, and an opposite end 18. A circular bottom side 20 of the housing, lying in plane 20a (FIGS. 1-5), faces substantially opposite from, but at a slight angle with respect to a center line along the top surface of top side 14 (FIGS. 1 and 2). Thus housing 12 converges, in side elevation and in cross section, between the top side and bottom side, moving towards the opposite end 18 relative to the inlet end 16 and has a sleek low profile construction.

Figure 3:
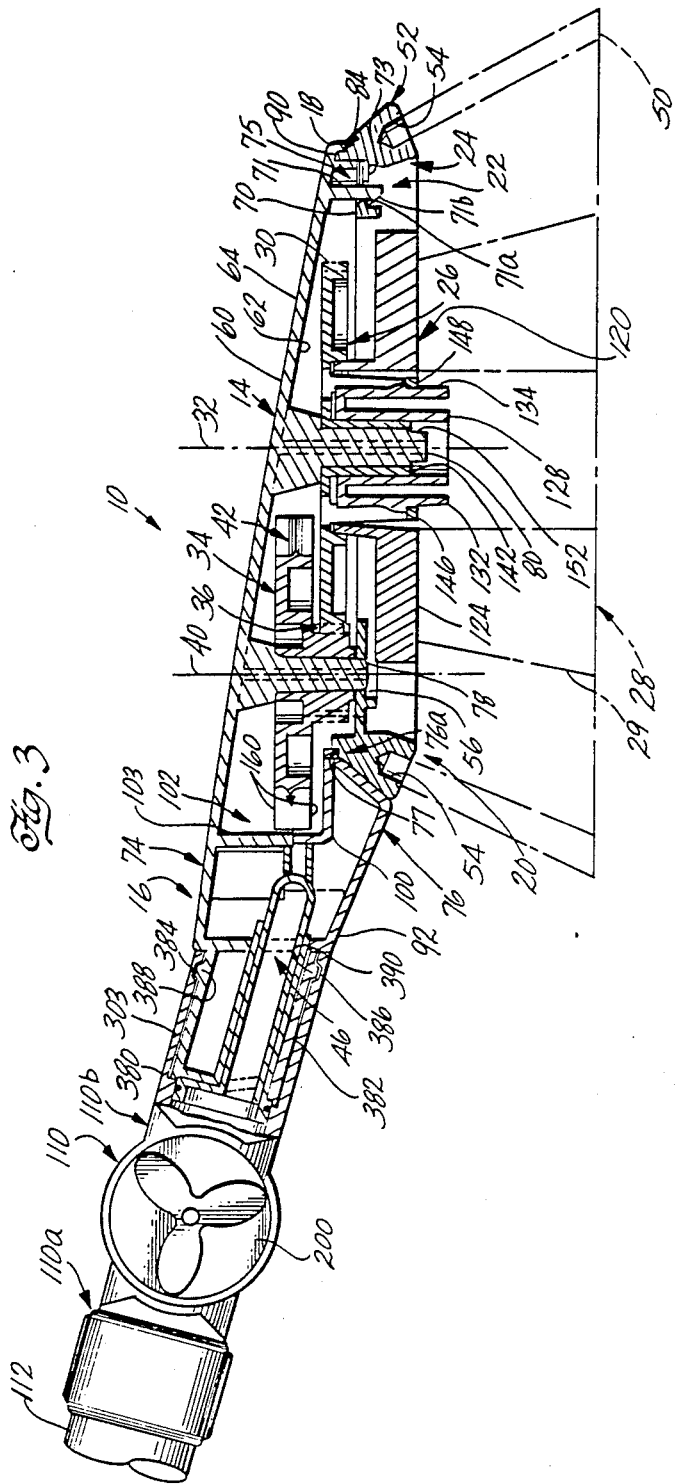
FIG. 3 is a cross-sectional view of the rotary scrub brush of FIG. 1 taken along the lines 3—3 of FIG. 2.
Figure 4:
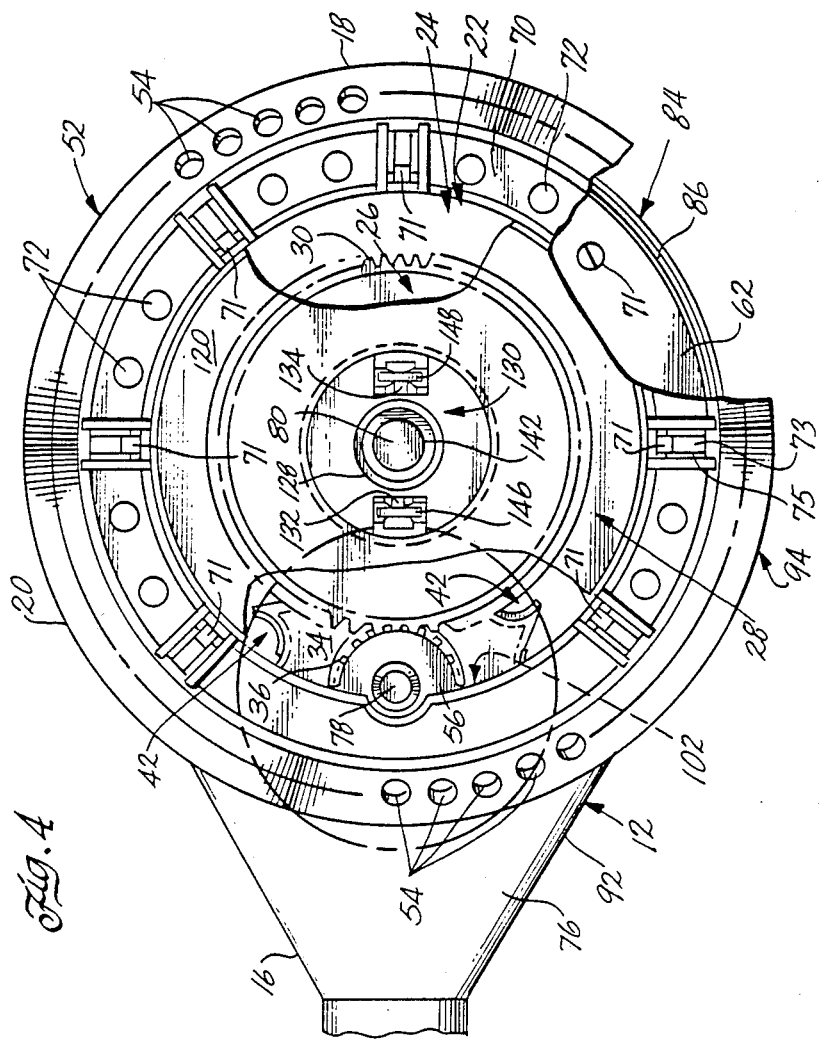
FIG. 4 is a bottom elevation view of the rotary scrub brush of FIG. 1 with the fluid passing swivel and conduit broken away from the inlet end of the housing. The bristles in the rotary brush and in the brush base ring are omitted for clarity. A portion of the brush base ring and the base of the rotary brush have been broken away to better reveal the upper housing. Not all of the apertures in the brush adaptor nor the gear teeth on the adaptor and the gear teeth on the waterwheel are shown, the others being indicated by broken lines for clarity. The outline of the tips of the waterwheel which are not exposed in FIG. 4 are indicated by a broken circular line.

The housing 12 also includes a cavity 22 and circular opening 24 which extends through the bottom side 20 to the cavity as best seen in FIGS. 3 and 4.

The housing 12 also contains and mounts preferably substantially in the cavity 22, brush mounting adaptor 26 for removably mounting rotary brush 28 both of which face out of the opening 24 from the cavity 22. Also within the cavity and affixed to the adaptor are adaptor gear teeth 30 (FIG. 3). The adaptor gear teeth 30 are arranged in a circular array facing radially outwardly around a perimeter of the adaptor (FIG. 4). The adaptor and the adaptor gear teeth, are preferably a unitary plastic molded part, and are mounted for coaxial rotation about common axis 32 (FIG. 3) extending out of the center of the circular opening 24.

Also within the cavity is a generally circular disk shaped fluid driven waterwheel 34 and, affixed thereto, waterwheel gear teeth 36. The waterwheel and waterwheel gear teeth are preferably a unitary plastic molded part and are coaxially mounted for rotation about a second common axis 40 (FIG. 3) parallel with axis 32 and extending out of the opening 24. Both axis 32 and axis 40 are in line with and parallel with plane 14a. The axis 40 is displaced from the axis 32 towards the inlet end 16. The waterwheel gear teeth 36 form a pinon gear and are engaged in direct driving relation with the larger diameter adaptor gear teeth 30. Additionally, the waterwheel has a plurality of generally radially extending, but curved water vanes 42 (FIGS. 3, 4 and 5) arranged in a circular array around the periphery of the waterwheel. The vanes of the water wheel are axially displaced along the axis 40 towards the top side 14 from the waterwheel gear teeth 36 and the adaptor gear teeth 30.

Also within the cavity 22 is a tubular nozzle 46 for dispensing against the water vanes, at a position displaced towards the inlet end 16 from both axes 32 and axis 40, fluid received from the inlet end.

Fluid leaving the nozzle 46 engages and drives the vanes rotating the waterwheel 34 which, in turn, rotates the waterwheel gear teeth 36, which in turn rotates the adaptor gear teeth 30 and the adaptor 26 and thereby rotating the rotary brush 28 mounted on the adaptor. The ratio between the waterwheel gear teeth and adaptor gear teeth is such that high power and output torque are achieved for even a low fluid pressure to the input of the nozzle.

A substantially ring shaped and fixed array of fibers or bristle 50 are mounted in the housing and extend away from the bottom side 20 around the opening 24. A substantially ring shaped and fixed main brush base 52 is, adapted to be mounted to and forms part of the housing 12 and is adapted for mounting the bristles 50. The brush base 52 is an injection molded unitary plastic housing portion separate from the rest of the housing portions. The bristles 50 are plastic fibers grouped into tufts (not shown), each tuft fixed together by a ring shaped wire (not shown). Each tuft, together with the wire, is inserted into a different one of openings 54, which are equally spaced in a circle around the lower side of the brush base 52 (FIGS. 1, 3 and 4). Although each of the openings 54 are shown as being circular, in a preferred arrangement each is D shaped in cross sections so as to make it easier to automatically machine insert the tufts of bristles into the holes. The brush base 52 is substantially ring shaped and is easily attached to the upper housing by self interlocking mechanical locking means during the assembly operation.

The rotary brush 28 has a disk shaped injection molded plastic base 124 whose lower surface lies, in the plane of the bottom side 20, into which plastic bristles or fibers 29 are mounted. The bristles 29 extend away from the bottom side and preferably diverge outward slightly as depicted in FIGS. 1 and 3.

Consider the construction of the housing 12 in more detail. The housing includes upper housing portion 74 and a lower housing portion 76 that are separate from each other and from the brush base 52, each being an injection molded unitary plastic part. The upper housing includes at least one wall 60 which defines an inside wall 62 and an outside wall 64 of the housing. The wall 60, including the inside and outside walls 62 and 64, forms a thin shell and converges towards the bottom side moving towards the opposite end 18 from the inlet end 16. Additionally, the wall 60, including inside wall 62 and outside wall 64 and the top side 14 converge towards the bottom side 20 moving transversely in opposite directions from plane 14a moving from the inlet end to the opposite end, as seen in FIG. 2. Also, as seen from the top in FIG. 2, the housing is generally tear dropped shaped with converging throat portion 92 extending from a substantially circular portion 94. As a result the cavity 22 inside of the housing is quite restricted in size limiting the number of and the possible positions, orientation and configuration of the internal parts. Significantly, the waterwheel, waterwheel gearing adaptor and adaptor gear teeth and rotary brush base are all located substantially within the cavity and the cavity, as well as a side cavity yet to be described, are all positioned, oriented and configured, within the housing.

Fluid from the nozzle 46 striking the water vanes is thrown out by the water vanes against the inside wall 62 of the cavity which, in turn, directs the fluid in a rotating or swirling action down towards the opening 24 around the rotary brush 28. More specifically, fluid comes out of the nozzle at a high velocity and is thrown off of the waterwheel and the adaptor at a high velocity. As a result, the fluid tends to have a high velocity circular pattern flowing around the opening and around the rotary brush and, if not inhibited, is thrown radially outward, as it exits the opening, against the user and other persons or objects in the vicinity in addition to the object being cleaned. To prevent this undesirable action a baffle is provided for slowing the rotation of the fluid passing out of the opening.

The baffle includes a substantially radially inwardly extending fluid diverter (i.e. ring 70) in the opening and means (i.e., finger 71) for slowing the rotation of the fluid around the diverter before it passes out of the opening to this end. The brush base 52 has, as an integral part, an inwardly extending circular shaped ring 70 (FIGS. 3 and 4) extending substantially completely around the opening 24, and around the adaptor, the adaptor gear teeth, and rotary brush, slowing the velocity of the fluid as it passes out of the opening and for redirecting the flow of the fluid back toward the center of the opening 24. A circular array of elongated resilient members or latch fingers 71 extend at various positions through the ring to hold the brush base in place in the housing. These members baffle or slow down the rotating fluid and inhibit the rotation of the fluid allowing the fluid to flow more slowly and evenly out of the circular array of openings 24 and around the sides of the adaptor and rotary brush. This helps minimize the throwing of water out of the opening and against the user and directs the fluid around the rotary brush 28 to the surface being washed. To this end the ring has a plurality of holes 72 through the ring 70. The holes 72 extend in a generally circular array around the opening 24 (FIG. 4).

A waterwheel shaft 78, extends from the inside wall 62, about which the waterwheel and waterwheel gear teeth are mounted and rotate. An adaptor shaft 80 also extends from the inside wall about which the adaptor and adaptor teeth are mounted and rotate. Preferably, the upper housing includes, as an integral part thereof, the shafts 78 and 80 and a side cavity wall 103 (FIG. 3) all extending away from the inside wall 62 parallel with each other towards the bottom side.

Preferably, the upper housing portion 74 also includes a downward facing circular grooved mounting surface 84 (FIGS. 3 and 5) terminating at ends 364 and 368 of the lower housing portion 76. The grooved mounting surface 84 and the ends 364 and 368 of lower housing portion 76 contain circular aligned grooves 86, 365 and 369, respectively, into which a circular ring shaped tongue 90, formed on the upper side of main brush base 52, extends. The tongue and groove arrangement not only affix the main brush base and the upper and lower housing portions transverse to each other, but provide a seal preventing water from leaking out between the main brush base and the upper and lower housing portions. It will be understood that the parts on which the tongue and groove are located could be reversed with suitable redesign.

The lower housing portion 76 is attached to the upper housing portion 74 on the opposite or lower side from the top side and towards the inlet end 16 and is limited in length or size so as to leave the circular mounting surface 84 of the upper housing exposed. The upper housing portion and the lower housing portion form, as seen from the side (FIGS. 1 and 3) a throat portion 92 which extends from the circular portion. The throat portion extends at a slight acute angle to the plane of the bottom 20. The nozzle 46, another injection molded plastic unitary part, is positioned, held and secured between the upper and lower housing portions 74 and 76 in the throat portion 92 and forms a passage for passing fluid to a waterwheel cavity and the waterwheel.

Figure 5:
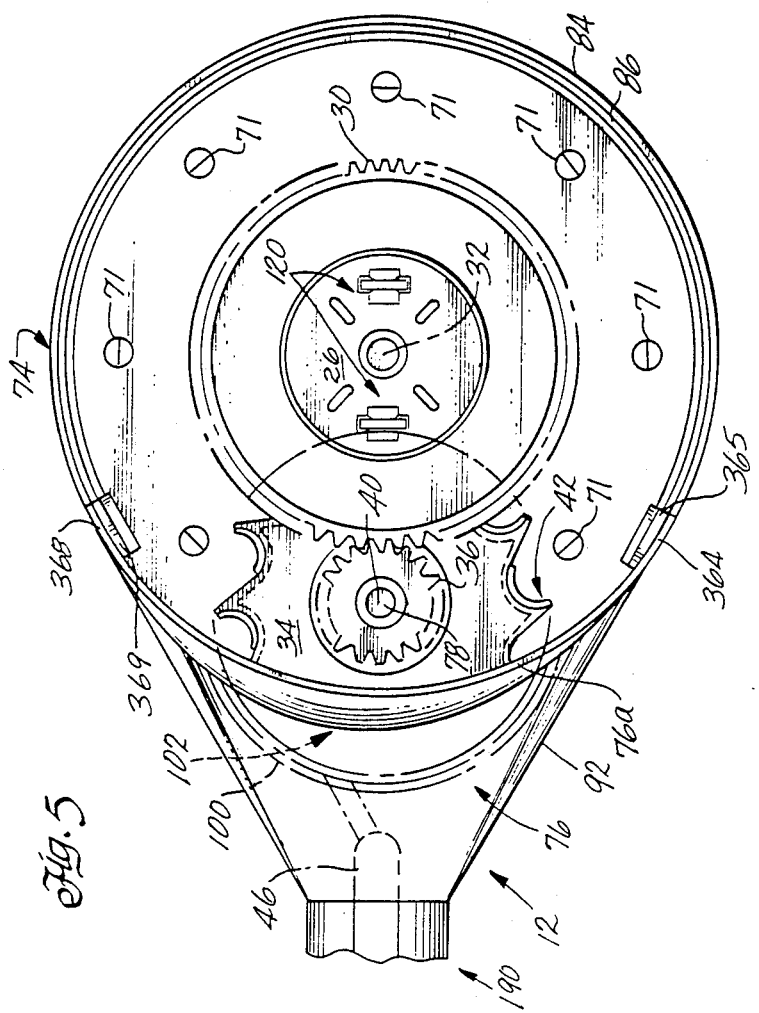
FIG. 5 is a bottom elevation view similar to FIG. 4 with the rotary brush and the fixed brush base removed revealing the interior parts.

Fixed brush base 52 also has a circular ring shaped mounting surface 77 radially outside of and adjacent to tongue 90. Surface 77 abuts and mounts on the circular mounting surface 84 and circular mounting surface 76a of the lower housing (FIGS. 3 and 5).

Within the housing is a shroud 100 (FIGS. 2, 3, 19, 21) which, together with the wall 103 and inside wall 62 of the upper housing portion 74, form a side waterwheel cavity 102 opening into the side of the main cavity 22. As seen from the top, the shroud and cavity 102 are each generally crescent shaped (FIG. 2), and the shroud in cross section, is generally "L" shaped (FIG. 3). The shroud i s an injection molded unitary plastic part. A portion of the waterwheel, including the blades of the waterwheel, rotate into the side waterwheel cavity 102 for receiving the fluid from the nozzle.

A fluid passing swivel 110 is connected at and is in fluid communication with the fluid inlet end 16 and nozzle 46 and is adapted for coupling to a fluid supply conduit 112. The swivel has one part 110b connected to throat portion 92 and a second part 110a connected to conduit 112. Each of the parts 110a and 110b is an injection molded unitary plastic part and together, along with conduit 112 and the rotary brush head, are adapted to be rigidly locked together in any of a plurality of relative angular positions and yet pass the fluid. The positions include the positions 195 depicted by a broken line in FIG. 1, which are at acute angles relative to the conduit 112.

The brush and brush adaptor comprise locking means (i.e., fingers 132 and 134 and locking parts 146 and 148), actuable to a locked condition for locking the brush and the adaptor together responsive to and during the movement of the rotary brush 28 toward the adaptor, parallel with the axis 32 of rotation of the adaptor. The locking means is finger deactuable to allow removal of the rotary brush from the adaptor. The locking means is also a cam actuated locking means, which automatically actuates the locking means to a locked condition during movement of the brush towards the adaptor.

Consider now the adaptor 26 and the rotary brush 28 in more detail. The rotary brush 28, as depicted in FIGS. 10 and 11, includes a brush base 120 preferably molded as a unitary plastic part on which is mounted a ring shaped array of bristles 28 extending away from the base as generally depicted by broken lines in FIGS. 1, 3 and 10. The brush base 120 includes a disk shaped base portion 124 and a cylindrical base portion 126 coaxial with and extending from -he opposite side of the base portion 124 from the bristles 28. The base portion 124 includes a coaxial hub 128 which mounts around a hub 142 on the adaptor 26. A ring shaped recess 130 in the base portion 124 extends coaxially around the hub 128. Resilient fingers 132 and 134, forming part of the locking parts extend, parallel with the axis of rotation, from the bottom of the recess 130 of base portion 126. The fingers 132 and 134 are symmetrically positioned on opposite sides of the axis 32 of the adaptor. Apertures 136 and 138 extend through the base portion 126, and are positioned radially outward from and immediately adjacent to, respectively, the fingers 132 and 134. The fingers 132 and 134, being injection molded as a plastic unit with the rest of the brush base 120, are resilient and are normally urged to the upright position parallel with the axis 32 as depicted in FIG. 10. The fingers 132 and 134 contain cam surfaces 132a and 134a, respectively, and stops or locking surfaces 132b and 134b, respectively, facing away from the adaptor.

Consider now the details of the brush mounting adaptor as best seen in FIGS. 3 and 5 though 9. The adaptor 26 includes a generally disk shaped portion 140 having a cylindrical shaped hub 142 both coaxial with axis 32. The adaptor gear teeth 30 are formed around the perimeter of and face out from the disk shaped portion 140. A ring shaped recess 144, coaxial with axis 32, is formed around the hub 142, facing in the direction of the brush base, and into which the cylindrical shaped base portion 126 of the brush base 120 extends. Inverted "U" shaped locking parts 146 and 148 extend from the bottom of the recess 144 generally parallel with the axis 32 adjacent to, respectively, the fingers 132 and 134. The locking parts 146 and 148 have stop or transverse locking surfaces 146a and 148a, respectively, which engage the oppositely facing transverse stop or locking surfaces 132b and 134b on the fingers of the brush base. Spacers 150, four being shown by way of example, are provided in the ring shaped recess 144 for spacing the facing surfaces of brush base portion 126 and of the recess 144 so that when fluid is between the adaptor and brush base, the suction that would otherwise be caused is reduced or eliminated, thereby, making it easy to remove the brush base from the adaptor with virtually no force.

The adaptor is mounted with the hub 142 rotatably mounted around the shaft 80 and a metal clip 152 (FIG. 3), affixed to the shaft 80, retains the hub 142 and thereby the adaptor in place, but leaves the adaptor free to rotate. The brush 28 is inserted onto the adaptor with the hub 128 passing around the exterior of the hub 142 while inserting the brush base 120 towards the adaptor, substantially parallel with the axis 32, the cam surfaces 132a and 134a of the fingers 132 and 134, respectively, are forced inward by the edges of the locking parts 146 and 148 forcing the fingers 132 and 134 to bend towards the axis 32. As the brush base continues to so move the locking surfaces 132b and 134b pass under the locking parts 146 and 148, engaging the stop or locking surfaces 146a and 148a, thereby, locking the brush base in tight engagement with the adaptor. It will now be appreciated that the fingers 132 and 134 and the locking parts 146 and 148 form interlocking locking means which are self actuated to a locked condition for locking the brush and adaptor together responsive to movement of the brush by the user toward the adaptor and parallel with the axis of axis 32.

The locking means is also finger deactuable by the user for unlocking and removal of the brush from the adaptor. To this end, the fingers 132 and 134 may be user finger pinched or actuated towards each other towards the axis 32 until the transverse locking surfaces 132b and 134b move out from underneath the stop or locking surfaces 146a and 148a allowing the brush to be drawn, by the user, away from the adaptor parallel with the axis 32 while still pinching the fingers 132 and 134. The brush is therefore, easy to mount and remove, being self interlocking or snapped into a locked condition during movement of the brush towards the adaptor and finger pinched or actuated for easy unlocking and removal.

Also, the fingers 132 and 134 extend closely adjacent and along the side of hub 134 are, therefore, protected from overstress. As best seen in FIG. 3, when pinched, the fingers are only allowed to move inward until they engage the side of the hub which forms a stop to prevent stressing and breaking of the fingers.

It will also be noted that the finger 132 and aperture 134 and 136 are symmetrically positioned on the opposite side of axis 32 from finger 134 and aperture 138. As a result, actuation of the fingers 132 and 134 does not tend to cant the brush base at an angle relative to the hub of the adaptor, thereby, making the brush easy to remove.

A fluid driven driver for a rotary brush is disclosed with gearing that has a high degree of torque and power output, even though space for parts is small. The high torque and power output results, in part, from a unique design in the waterwheel. Each vane of the waterwheel has a pair of unobstructed open ends 160, one on each side of a vane surface 164. Ends 160, for each vane, are spaced apart in a direction parallel with the axis of the waterwheel. A fluid diverter 162 in the form of a ridge, is elongated transverse to the axis along each vane surface 164 and separates the pair of ends thereby diverting the fluid striking the vane surfaces, simultaneously, in opposite directions past the pair of ends 160 parallel with as in 40. A filet or circular curved surface 163 on each side of the ridge fades, into a portion 167 of the vane surface 164. The portion 167 on each side of the diverter 162 is substantially parallel to axis 40. Fluid from nozzle 46 strikes the surface 164 and is diverted by diverter 162 in opposite directions across the portions 167 and over the ends 160.

As best seen in FIGS. 3, and 12, each of the vanes extends substantially radially outward from the axis 40 between the corresponding pair of open ends 160 to a tip end 166 of the vane. Surface 164 of each vane is circular or curved and includes the rib 162, and the opposite side 169 of each vane is substantially flat. Each vane also has a wall 165 between adjacent vanes that converges to a narrow edge at the tip end 166. The circular or curved side 168 is on one side of the wall 165 and the flat side on the other. The stream of water flows from the nozzle 46 substantially tangential to a circle 34a coaxial with axis 32 that intersects the curved side or surface 168 and substantially parallel with a plane that is perpendicular to the axis 32 and such that the water strikes the curved side 168 of the vane. As the waterwheel is forced by the water to rotate clockwise as seen in FIG. 12, the end 166 of the next vane easily enters into the stream of water allowing the stream of water to immediately commence striking the curved surface of the next vane. The straight side between the two vanes never substantially comes into contact with the stream of water thereby preventing a counteracting force on the waterwheel.

The fluid diverter 162 diverts the water, striking the curved side 168, in opposite directions along portion 167 on opposite sides of the diverter passed the opposite unobstructed ends 160 of the vane. Both of ends 160 of each vane are open and are not cupped. Thus the combined diverter and unobstructed ends of the vane prevent the water from puddling. Puddling damps the force of the water against the vane and reduces power output. In addition, space is provided vertically above and below the waterwheel in cavity 102 adjacent the opposite pair of ends 160 (FIG. 3) allowing the water to be freely dissipated or passed off the ends 160 further reducing the tendency to puddle. Thus a high torque, high power brush is provided which provides high output power to the rotary brush within the confines of the small housing and cavity. Also, the side cavity diverts the amount of water that the waterwheel must move if submerged in a pool of water and thus maximizes power output under submerged conditions.

Consider now in more detail the fluid passing swivel 110 (see FIGS. 2 and 14). The fluid passing swivel is connected to the pipe or fluid supply tube conduit 112 by swivel part 110a. The swivel part 110a has a female threaded coupling 172 threaded onto a threaded end of the supply tube 112, for passing fluid from the tube 112 to an inlet fluid passage 174. The inlet fluid passage 174 is in communication with an annular passage 176 passing coaxially around a cylindrical boss 178 and a circular metal shaft 180. The shaft 180 is rigidly, molded during the molding of swivel part 110a, in the boss 178 and extends transverse to the flow of fluid through the conduit 112. Swivel part 110a also includes an "O"]ring 182 outside of a circular array of alternating teeth and grooves 184, the "O" ring and array being coaxial with shaft 180. Swivel part 110b is provided on the rotary scrub brush head for passing fluid through passage 192 into the central passage (not shown) of the nozzle 46 (see FIG. 2). The swivel part 110b includes a circular array of teeth and grooves 194 in opposed relation to and engaging with, respectively, the teeth and grooves 184 in the swivel part 110a. A flat sealing surface 196 abuts the "O" ring 182 forming a tight seal when the swivel parts 110a and 110b are axially drawn together along the shaft 180. Swivel part 110b has a bore 198 which is rotatably mounted on the shaft 180. Knob 200 has a threaded bore (not shown) which threads onto a threaded end of shaft 180 drawing the swivel parts 110a and 110b and their respective teeth and grooves engagement with each other. When so locked together, the angle of the rotary scrub brush head is fixed relative to the swivel part 110a and thus the fluid supply tube 112. The knob 200 may be loosened to allow the swivel parts 110a and 110b to be separated efficiently to allow the teeth and grooves of the two parts to be separated and swivel part 110b and the head rotated relative to the fluid supply tube 112 in either of two directions to the acute angles indicated by broken lines in FIG. 1 or any of many positions between.

The swivel part 110a is an injection molded unitary plastic part. The swivel part 110b is an injection molded plastic part with the metal shaft molded in place in the plastic.

Preferably, a fluid cleaning apparatus is disclosed which includes an interchangeable fluid driven rotary scrub brush head and high fluid pressure nozzle. The head and the nozzle each have an individual fluid inlet for receiving the fluid and a conduit or fluid supply tube is provided for supplying fluid to the apparatus. Referring now to FIGS. 15, 16 and 17, fluid passing swivel part 110a is on the fluid supply conduit for passing fluid therethrough, from a fluid supply conduit and a fluid passing swivel part 110b is on the head for passing fluid to the fluid input of the head. Significantly, a further fluid passing swivel part 110c is provided for a high fluid pressure nozzle 212 and passes received fluid to the fluid inlet of the nozzle 212. Swivel part 110c and nozzle 212 are injection molded unitary plastic parts. For purposes of explanation, the nozzle 212 is a simple tubular member with a small passage 214 for spraying water against the object to be cleaned in a concentrated spray. It will be understood that deflectors or other implements common in the art, may be added on the end of the spray nozzle 212 for causing a spray, or other pattern of water, to be formed from the fluid being discharged by tube 214.

The construction of the swivel part 110c is identical to the swivel part 110b and, therefore, the details thereof will not be repeated, except to point out that the swivel part 110c includes an annular passage, a circular array of teeth and grooves for interconnection between, respectively, the circular array grooves and teeth of swivel part 110a and an annular seal surface for sealing against the "O" ring 182, the same as swivel part 110b.

It should now be understood that the swivel parts 110b and 110c are individually interchangeable and rotatably coupled to the swivel part 110a for receiving and passing fluid passed by the swivel part 110a. The swivel parts 110b and 110c are adapted for rotatably adjusting, respectively, the brush head and the nozzle relative to the swivel part 110a about an axis transverse to the fluid supply tube. In this regard the broken lines in FIG. 16 depict the nozzle 212 being rotated upward to an acute angle relative to tube 112 and downward to an acute angle relative to tube 112. It will be understood that the nozzle 212 and swivel 110c can be positioned to any one of a plurality of positions in between the two extremes and then locked together.

A fluid driven rotary scrub brush is disclosed that has a low profile plastic housing and in conjunction therewith a method is disclosed herein for assembling a fluid driven rotary scrub brush so as to minimize and even eliminate entirely glue joints.

Considering the method in more detail, the nozzle 46 is first assembled onto the upper housing 74. The nozzle is a unitary molded plastic tubular part including a large conduit portion 302 (FIG. 12) having two diametrically opposed raised alignment guides 304 extending longitudinally, one on each side of the conduit portion 302, one shown on the facing side in FIG. 12 and one not shown but on the opposite side. Referring to FIGS. 2, 3 and 12, an enlarged grooved end portion 306 of the nozzle (FIG. 12) contains an "O" ring 308 in the groove which is positioned outside of the left hand end of the cylindrical inlet end 16. The cylindrical end is formed by the left hand end of the end portion 303 of the upper housing portion 74 and the left hand end portion 382 of the lower housing portion 76. The nozzle 46 has a small conduit portion 310 from which water is actually dispensed against the vanes of the waterwheel which rests in a groove formed in wall 103.

The waterwheel and the waterwheel gear teeth are next assembled onto the waterwheel shaft 78.

The adaptor and adaptor gear teeth are assembled onto shaft 80 with the waterwheel and adaptor gear teeth engaged.

The metal clip 152 is fastened onto the adaptor shaft 80 thereby retaining the adaptor in place.

The shroud 100 is added to the parts assembled as described up to this point forming with the upper housing a crescent shaped cavity for the waterwheel to rotate into. Shroud 100 has a generally crescent shaped plan view as seen in FIG. 19 which faces the inside wall 62 of the upper housing. The shroud is mounted on the upper housing such that a generally "U" shaped wall 312 rests on the edge of the wall 103 which faces outward from FIG. 12, a notch 314 formed in the wall 312 extends around the smaller circular shaped conduit portion 310 of the nozzle 46 and alignment posts 313 and 316, extending into, respectively, apertures 320 and 322 in the upper housing portion 74 thus retaining the shroud 100 relative to the upper housing portion 74 in a transverse direction.

The lower housing portion 76 (FIG. 21) is next mounted on the upper housing portion in the assembly just described. To this end, spaced apart circular apertures 330 and 332 with, respectively, grooves 334 and 336, extend around the conduit portion 302 of the nozzle and the raised alignment guide 304, alignment posts 340 and 342 are extended into apertures 344 and 346, respectively, in the upper housing portion 74, and alignment apertures 354 and 356 on the lower housing extend around, respectively, the alignment post 350 and 352 on the shroud (which is now mounted on the upper housing). The apertures and posts 340, 342, 344, 346, 350, 352, 354 and 356 thereby retain the lower housing and upper housing against transverse relative movement.

The lower housing portion has, at a generally "U" shaped end 360, has legs or ends 362 and 364 which have, respectively, tabs 366 and 368 extending outward as seen in FIG. 21 and, when assembled, along the inside edge of tabs 370 and 372 in the upper housing portion 74 (FIG. 12). This retains the "U" shaped end 360 of the lower housing preventing transverse movement relative to the upper housing. The brush, after assembly of the parts just described, is generally depicted in FIG. 5.

The waterwheel, up to this point, has not been retained against axial movement along the shaft 78. The retention of the waterwheel is provided by the main brush base 52 which is yet to be assembled onto the upper and lower housing assembly of FIG. 5.

Also, the upper and lower housing portions have not been locked to prevent separation at right angles to the surface of FIG. 5. The upper and lower housings are principally locked together by a tubular plastic fluid coupling 380 formed as part of swivel part 110b. To this end the tubular shaped portion 380 is axially slid over the cylindrical portion (formed by parts 303 and 382 of, respectively, the upper and lower housings). Interlocking mechanical locking parts include outwardly extending grooves 384 and 386 on the inside of coupling 380 into which slide interlocking mechanical locking parts or shoulders 388 and 390 on the exterior of the cylindrical portion formed by each of the upper and lower housings (FIGS. 3, 17, 18). The result is the assembly, without the fixed brush base 52 and bristles 50, seen in FIG. 3. The interlocking parts automatically self-interlock while the coupling 380 is slid axially in a straight line along the cylindrical portion. No glue nor any screws, or other locking parts are required to lock the parts together, therefore, a very inexpensive low cost method and means is provided for not only affixing the coupling 380 to the housing, but for locking the upper and lower housing parts together.

Next, the ring shaped brush base 52 is mounted, onto the assembly of FIG. 5. Interlocking mechanical locking parts are provided for automatic self-locking the brush base 52 to the upper housing during movement in a straight line towards the upper housing. To this end elongated resilient members 71 (FIGS. 3, 4 and 18), seven shown by way of example, are molded on and extend parallel with the axis 32 away from the inside wall 62 of the upper housing portion 74. The resilient members 71 are disposed in a circular ring molded on the inside wall 62 adjacent to the circular mounting surface 84 (FIG. 3 and 4) of the upper housing.

The interlocking mechanical locking means further includes, as part of the locking means, the lower surface (as seen in FIG. 3) of the inwardly extending ring 70. The elongated resilient members 71 include a transverse notch or stop surface 71a which form an interference with and engage the lower surface of the ring 70 retaining the brush base onto and against both the upper and lower housings. Corresponding to each of the elongated resilient members 71 is an opening 75 in ring 70 through which the corresponding resilient member 71 extends. A resilient spring board 73 molded on the brush base in ring 70 extends transversely into each of the openings 75 retaining the elongated resilient member 71, after assembly, to the left as seen in FIG. 3 and in the interference position between the lower stop surface of the ring and the stop surface 71a on the member.

During assembly of the brush base 52 onto the assembled parts as seen in FIG. 5, the brush base 52 is moved in a straight line towards the circular mounting surface 84 and the upper housing portion and parallel with the axes 32 and 40 until cam surfaces 71b (FIG. 3), inclined on the end of each of resilient members 71, come in contact with the aperture of the corresponding opening 75. Continued movement of the brush base towards the housing causes each of the resilient members 71 to deflect radially outward from axis 32, due to the pressure of the apertures, thereby engaging the upper surface of corresponding resilient spring board 73. Each of the spring boards 73 deflect downward in FIG. 3. Continued movement of the brush base cause the resilient members to deflect around the apertures until the stop surfaces 71a of all resilient members pass underneath the ring 70 at which point the resilient members spring due to their resiliency inward to the interference position of FIGS. 3 and 4. The resilient spring boards 73 also spring into the locking position (FIGS. 3 and 4) behind the resilient members 71 preventing the resilient members 71 from becoming unlocked.

The circular waterwheel 34 prior to mounting of the brush base is unrestrained axially on the shaft 78. However, brush base 52 has a radially inwardly projecting circular portion 56 (FIGS. 3 and 4) with an opening through which the shaft 78 extends and which thereby retains the waterwheel on the shaft 78. As result, no additional clips or fasteners are required.

The brush base, in addition to the other function described, overlaps mounting parts and surfaces 368, 364, 369, 365 and 76a of the lower housing portion and thereby sandwiches a portion of the lower housing portion 76 between the brush base and the circular mounting surface 84 of the upper housing thereby assisting in retention of the lower housing in place.

Accordingly, the foregoing description should not be read as pertaining only to the precise structures and techniques described, but rather should be read consistent with, and as support for, the following claims, which are to have their fullest fair scope.

What is claimed is:

1. A fluid driven assembly for a rotary brush, the assembly comprising:
   a housing comprising a top side elongated between an end and an opposite end of the housing, the end of the housing comprising a fluid receiving inlet, a bottom side facing substantially opposite from the top side, a cavity in the housing and an opening through the bottom side to the cavity, the housing converging in cross section between the top side and bottom side, moving towards the opposite end relative to the inlet end, the housing comprises an upper housing portion comprising a mounting portion extending at least partially around the opening;
   a fixed brush mounted on the mounting portion and having an opening therein and extending substantially around the opening in the housing;
   the housing containing, substantially in the cavity
      a rotary brush mounting adaptor for removably mounting a rotary brush facing out of the opening in the fixed brush base and adaptor gear teeth affixed to the adaptor, both the rotary brush mounting adaptor and the adaptor gear teeth being mounted for rotation about a common first axis extending out of the opening;
      a waterwheel and waterwheel gear teeth affixed to the waterwheel, both mounted for rotation about a second common axis, displaced towards the inlet end from the first axis, the waterwheel gear teeth being in driving engagement with the adaptor gear teeth and the waterwheel comprising water vanes axially displaced towards the top side from the waterwheel gear teeth and the adaptor gear teeth;
      a nozzle for dispensing against the water vanes, at a position displaced toward the inlet end from the second axis, fluid received from the inlet end;
      the upper housing portion comprising a substantially circular portion adjacent the opposite end and wherein the housing comprises a lower housing portion attached to the upper housing portion on the opposite side from the top side, the upper housing portion and the lower housing portion comprising a throat portion extending from the substantially circular portion and containing therein the nozzle and the fluid inlet; and
      a shroud defining, with the top wall, a waterwheel cavity which opens into the cavity, the waterwheel being at least partially positioned in the waterwheel cavity such that the vanes receive fluid from the nozzle in the water wheel cavity.

2. A fluid driven assembly for a rotary brush according to claim 1 wherein the waterwheel and waterwheel gear teeth comprise a unitary plastic part.

3. A fluid driven assembly for a rotary brush according to claim 1 wherein the fixed brush comprises a substantially ring shaped array of bristles extending substantially away from the bottom side and around said opening.

4. A fluid driven assembly for a rotary brush according to claim 1 wherein the housing comprises a first housing portion having a substantially ring shaped fixed brush base adapted to be mounted onto the first housing portion, and further adapted for mounting bristles around the opening and around such mounted rotary brush, said fixed brush comprising said fixed brush base and bristles.

5. A fluid driven assembly for a rotary brush according to claim 4 wherein the fixed brush base comprises a plastic ring attached to the first housing portion around the opening and brush bristles mounted on the ring and extending away from the bottom side.

6. A fluid driven assembly according to claim 4 wherein the brush base comprises substantially circular inner and outer perimeters.

7. A fluid driven assembly for a rotary brush according to claim 1 or claim 4 comprising, as a unitary part, the adaptor and around a perimeter of the adaptor, the adaptor gear teeth.

8. A fluid driven assembly for a rotary brush according to claim 1 wherein the housing comprises at least one wall defining the inside of the cavity and which converges toward the bottom side starting substantially at the inlet end and moving toward the opposite end from the inlet end.

9. A fluid driven assembly for a rotary brush according to claim 8 wherein the fluid is thrown out by the water vanes against the at least one wall of the cavity which in turn directs the fluid toward the opening around the rotary brush.

10. A fluid driven assembly for a rotary brush according to claim 9 comprising baffle means extending into the flow of fluid for slowing the rotation of the fluid passing out of the opening.

11. A fluid driven assembly for a rotary brush according to claim 1 wherein the housing comprises a top wall defining an inside wall of the cavity and comprising the top side, and comprising a first shaft extending from the inside wall on which the adaptor is mounted and rotates and a second shaft extending from the inside wall on which the waterwheel is mounted and rotates.

12. A fluid driven assembly for a rotary brush according to claim 11 wherein the first shaft and the second shafts are each mounted on the inside wall.

13. A fluid driven assembly for a rotary brush according to claim 12 wherein the top wall of the housing and the first and second shafts are molded into a unitary plastic part.

14. A fluid driven assembly for a rotary brush according to claim 11 comprising and a ring shaped fixed brush ring for mounting bristles around the opening and thereby forming the fixed brush.

15. A fluid driven assembly for a rotary brush according to claim 14 wherein the top side also converges toward the bottom side on opposite sides of a plane between the inlet end and the opposite end and in a direction transverse to the elongation of the housing.

16. A fluid driven assembly for a rotary brush according to claim 15 wherein the top side is substantially tear drop shaped.

17. A fluid driven assembly for a rotary brush according to claim 16 comprising a fluid passing swivel connected at and in fluid communication with the fluid inlet end for coupling to a fluid supply conduit.

18. A fluid driven assembly for a rotary brush according to claim 1 wherein the mounting portion and the fixed brush comprise, on one, a tongue and, on the other, a groove into which the tongue extends.

19. A fluid driven assembly as defined in claim 1 wherein the exterior of the housing is substantially symmetrical when viewed from the top side on opposite sides of a plane through the first and second axis.

20. A fluid driven assembly as defined in claim 19 wherein the housing comprises, when viewed from the top side, a circular portion adjacent the opposite end and an elongated throat portion which extends from the circular portion at the inlet end, the throat portion being, when viewed from the top side, substantially symmetrical about the center line.

21. A fluid driven assembly for a rotary brush, comprising:
a housing comprising a top side elongated between an end and an opposite end, the end of the housing comprising a fluid receiving inlet, a bottom side facing substantially opposite from the top side, a cavity in the housing and an opening through the bottom side to the cavity, the housing converging, in cross section between the top side and bottom side, moving toward opposite end relative to the inlet end;
a fixed brush extending substantially around the opening;
the housing containing substantially in the cavity a rotary brush mounting adaptor for removably mounting a rotary brush facing out of the opening and adaptor gear teeth affixed to the adaptor, both the rotary brush mounting adaptor and the adaptor gear teeth being mounted for rotation about a common first axis extending out of the opening;
a waterwheel and waterwheel gear teeth affixed to the waterwheel, both mounted substantially in the cavity for rotation about a second common axis, displaced toward the inlet end from the first axis, the waterwheel gear teeth being in driving engagement with the adaptor gear teeth and the waterwheel comprising water vanes axially displaced toward the top side from the waterwheel gear teeth and the adaptor gear teeth, and
a nozzle in the cavity for dispensing against the water vanes, at a position displaced toward the inlet end from the second axis, fluid received from the inlet end;
wherein the housing comprises at least one wall defining the inside of the cavity and which converges toward the bottom side moving toward the opposite end from the inlet end and wherein the fluid is thrown out by the water vanes against the at least one wall of the cavity which in turn directs the fluid towards the opening around the rotary brush, the assembly further comprising baffle means comprising, a substantially radially inwardly extending fluid diverter in the opening and means for slowing the rotation of the fluid around the diverter before passing out of the opening.

22. A fluid driven assembly according to claim 21 wherein the means for slowing comprises a member extending into the cavity on the side of the fluid diverter opposite from the bottom side.

* * * * *

UNITED STATES PATENT AND TRADEMARK OFFICE
CERTIFICATE OF CORRECTION

PATENT NO. : 4,856,133

DATED : August 15, 1989

INVENTOR(S) : George Sanchez

It is certified that error appears in the above-identified patent and that said Letters Patent is hereby corrected as shown below:

In the Specification:

Column 2, line 31, change "pressures" to -- pressure --.

Column 3, lines 7,9,17, change "waterwheel" to -- waterwheels -- (all occurrences).

Column 3, line 13, change "Hydraulic Turbines by R.M. Donaldson" to -- "Hydraulic Turbines," by R.M. Donaldson, --.

Column 3, line 16, after "other" insert -- waterwheel --.
Column 3, line 48, after "the" delete the comma.

Column 4, line 7, before "gear" delete "wheel".

Column 5, line 35, change "waterwheel" to -- waterwheel --.

Column 7, line 40, after "driver" insert -- 10 --.
Column 7, line 45, change "center line" to -- centerline --.

Column 8, line 13, change "water wheel" to -- waterwheel --.
Column 8, line 20, before "40" delete "axis".
Column 8, line 34, after "is" delete the comma.

Column 9, line 32, change "i.e" to -- i.e., --.

Column 10, line 41, change "i s" to -- is --.

Column 11, line 9, change "-he" to -- the --.

Column 12, line 55, after "3," insert -- 5 --.

UNITED STATES PATENT AND TRADEMARK OFFICE
CERTIFICATE OF CORRECTION

PATENT NO.  :   4,856,133
DATED       :   August 15, 1989
INVENTOR(S) :   George Sanchez It is certified that error appears in the above-identified patent and that said Letters Patent is hereby corrected as shown below:

Column 13, line 12, change "passed" to -- past --.
Column 13, line 42, before "ring" delete "]".

Column 16, line 67, after "As" insert -- a --.

In the Claims

Column 17, line 63, change "water wheel" to -- waterwheel --.

Column 19, line 25, after "toward" insert -- the --.

Signed and Sealed this

Twenty-ninth Day of January, 1991

*Attest:*

HARRY F. MANBECK, JR.

*Attesting Officer*        *Commissioner of Patents and Trademarks*